(12) United States Patent
Vaishnav et al.

(10) Patent No.: US 7,366,207 B1
(45) Date of Patent: Apr. 29, 2008

(54) HIGH SPEED ELASTIC BUFFER WITH CLOCK JITTER TOLERANT DESIGN

(75) Inventors: Rohit Vaishnav, Karnataka (IN); Ravi Kumar, Karnataka (IN)

(73) Assignee: National Semiconductor Corporation, Santa Clara, CA (US)

( * ) Notice: Subject to any disclaimer, the term of this patent is extended or adjusted under 35 U.S.C. 154(b) by 944 days.

(21) Appl. No.: 10/368,251

(22) Filed: Feb. 18, 2003

(51) Int. Cl.
*H04J 3/06* (2006.01)
(52) U.S. Cl. ............................... 370/509; 370/516
(58) Field of Classification Search ............... None
See application file for complete search history.

(56) References Cited

U.S. PATENT DOCUMENTS

| | | | | |
|---|---|---|---|---|
| 4,823,365 A | * | 4/1989 | Loginov | 375/372 |
| 5,563,891 A | * | 10/1996 | Wang | 370/505 |
| 6,693,918 B1 | * | 2/2004 | Dallabetta et al. | 370/503 |
| 6,882,661 B1 | * | 4/2005 | Creedon et al. | 370/505 |
| 6,999,480 B2 | * | 2/2006 | Subrahmanyan et al. | 370/516 |
| 2001/0016023 A1 | * | 8/2001 | Roy et al. | 375/372 |
| 2003/0227945 A1 | * | 12/2003 | Braff et al. | 370/503 |

* cited by examiner

*Primary Examiner*—Edan Orgad
*Assistant Examiner*—Jung Park (57) ABSTRACT

A receiver for high-speed indirect synchronous digital data transmission includes an elastic buffer receiving an incoming data stream containing embedded timing information preceding a data sequence, generating a recovered clock from the timing information, initially synchronizing the frequency of a local clock to the recovered clock, and accommodating subsequent drift between the recovered and local clocks across the duration of the data sequence while tolerating clock jitter. Received data is clocked into a FIFO buffer within the elastic buffer based on the recovered clock and read out based upon the local clock, with the buffer expanding or contracting by adjustment of an index to accommodate skew of greater than one clock period. Expansion or contraction of the FIFO buffer is disabled during periods when clock jitter is likely, such as periods immediately following an index change.

18 Claims, 7 Drawing Sheets

HIGH SPEED ELASTIC BUFFER WITH CLOCK JITTER TOLERANT DESIGN

TECHNICAL FIELD OF THE INVENTION

The present invention is directed, in general, to recovery of data from indirect synchronous transmissions and, more specifically, to accommodating clock skew, with tolerance of clock jitter, following synchronization of a high data rate transmission.

BACKGROUND OF THE INVENTION

In addition to analog modulation and demodulation, digital communication requires timing information, used to identify the rate at which bits are transmitted as well as the start (and end) of each bit and to permit the receiver to correctly identify each bit in a transmitted message.

Synchronization of transmitters and receivers are characterized based on the source of timing information used at the receiver. If the timing signal employed by the receiver is generated in the receiver independent from the transmitter, transmission is termed asynchronous; however, if the receiver's timing signal is generated, either directly or indirectly, from the transmitter clock, transmission is characterized as synchronous. For direct synchronous transmission, a separate clock signal is transmitted. When timing is generated indirectly (indirect synchronous transmission), the timing information is embedded in the transmitted data and must be recovered from the data at the receiver, where the recovered timing information is employed to synchronize the receiver circuitry with the transmitter clock.

Indirect synchronous transmission is commonly used for high data rate transfers, including many packet-based protocols. In such systems, packet transfer is preceded by a synchronization sequence enabling the frequency for a local oscillator (LO) based local clock signal within the receiver to be adjusted to match the frequency of the recovered clock signal.

Local clock oscillators, however, are subject to drift due to voltage, aging or temperature. As a result, after initial synchronization, the local clock signal may drift from the recovered clock signal over the length of a packet, frame or other data sequence. Such drift between the clock signals can be cumulative, resulting in skew of greater than several clock periods between the two clocks over the length of the data transfer following the initial synchronization. In such cases, bits may be added or dropped from the incoming data stream, resulting in bit errors in the received data stream.

For lower data rates, accumulated skew between local and recovered clocks remains less than a clock period, even for long data transfers following an initial synchronization, since the drift is only a small percentage of the clock period (as the clocks are slower) and never reaches a clock period. As the data rate increases, however, drift between the clocks becomes a significant percentage of the clock period, and accumulated drift over the data sequence following the initial synchronization may equal many clock periods. The length of the data sequence in such cases must be constrained so that drift over the data transfer interval is not greater than a clock period, else faster clocks will result in bits being added or lost from the incoming data stream.

There is, therefore, a need in the art for a mechanism dynamically absorbing frequency error between local and recovered clocks following an initial synchronization to compensate for drift between the clocks in a high data rate transmission.

SUMMARY OF THE INVENTION

To address the above-discussed deficiencies of the prior art, it is a primary object of the present invention to provide, for use in a receiver for high-speed indirect synchronous transmissions, an elastic buffer receiving an incoming data stream containing embedded timing information preceding a data sequence, generating a recovered clock from the timing information, initially synchronizing the frequency of a local clock to the recovered clock, and accommodating subsequent drift between the recovered and local clocks across the duration of the data sequence while tolerating clock jitter. Received data is clocked into a FIFO buffer within the elastic buffer based on the recovered clock and read out based upon the local clock, with the buffer expanding or contracting by adjustment of an index to accommodate skew of greater than one clock period. Expansion or contraction of the FIFO buffer is disabled during periods when clock jitter is likely, such as periods immediately following an index change.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
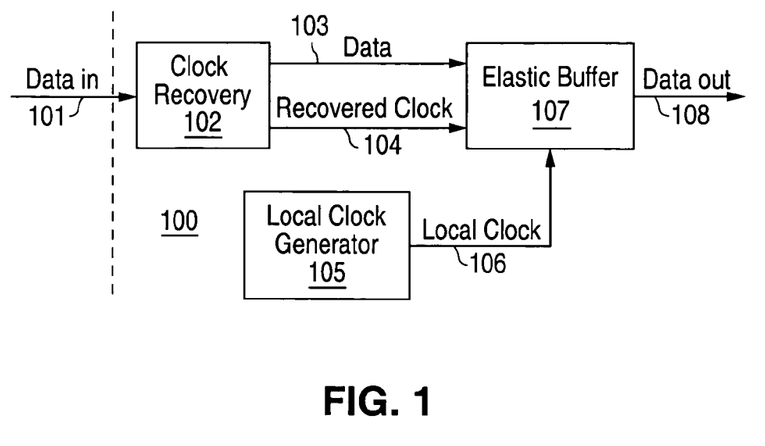
FIG. 1 depicts a high-speed synchronous data communication system according to one embodiment of the present invention.

FIG. 1 depicts a high-speed synchronous data communication system according to one embodiment of the present invention. System 100 includes a connection 101 within a receiver for receiving a signal containing packetized data with embedded timing information (i.e., the transmitted clock values) in the incoming data stream within a synchronization sequence preceding each packet or frame. A clock recovery circuit 102 extracts the transmitted clock information embedded in the incoming data stream, producing a data signal 103 and a recovered clock signal 104. A local clock generator 105 produces a local clock signal 106 that is initially synchronized at least in frequency to the recovered clock signal 104 at the beginning of each packet, frame or other data sequence. The packets or frames are independently transmitted, and the initial synchronization at the beginning of receipt of each packet or frame is expected to enable accurate recovery of the entire data sequence.

System 100 in the present invention includes an elastic buffer 107 receiving the data signal 103, the recovered clock signal 104, and the local clock signal 106. Elastic buffer 107 compensates for drift between recovered clock signal 104 and local clock signal 106 across the data transfer interval following the initial synchronization for high data rate transmissions. Elastic buffer 107 also provides data synchronous to the local clock signal 106 when the input data is sent in synchronism to the clock signal represented by recovered clock signal 104, providing a method of synchronization when data is transmitted using one clock signal and received using another clock signal with nominally the same frequency, where the two clock signals are initially synchronized but may exhibit drift over the length of the data sequence.

Elastic buffer 107 is employed to accommodate drift between the recovered clock signal 104 and the local clock signal 106 in a high-speed application such as Universal Serial Bus (USB) 2.0 connections. Typically an allowance for clocks must allow for a variation of 1000 parts per million (ppm) in frequency. A 1000 ppm drift between clocks due to voltage, aging or temperature can, for a packet size of 10,000 bits and a 480 megaHertz (MHz) local clock, cause a ±10 clock period skew between the recovered and local clocks. Absent elastic buffer 107, additional bits may be added to or lost from the incoming data stream.

In the exemplary embodiment, elastic buffer 107 is a 24 bit deep (or larger or smaller, depending on the size required) one bit wide first in, first out (FIFO) buffer with data clocked in by the recovered clock signal 104 and clocked out by the local clock signal 106. Elastic buffer 107 is primed by being filled with at least 12 bits of data clocked in by the recovered clock signal 104 before data is clocked out by the local clock signal 106. The number of bits within the buffer 107 then expands or contracts in size depending on the skew (positive or negative) between the clock signals 104 and 106.

The elastic buffer 107 expands or contracts by one bit when the skew between the clock signals 104 and 106 equals one additional clock period. If the local clock signal 106 is faster than the recovered clock signal 104, elastic buffer is emptied more quickly than it is filled, and thus the buffer 107 contracts in size from the initial 12 bits to 11, 10, 9, etc., down to zero. Below zero, an underflow condition is flagged. If the local clock signal 106 is slower than the recovered clock signal 104, the buffer 107 is emptied slower than it gets filled, and thus the buffer expands from the initial size of 12 bits to 13, 14, 15, etc. up to 24 bits, beyond which an overflow condition is flagged.

Figure 2:
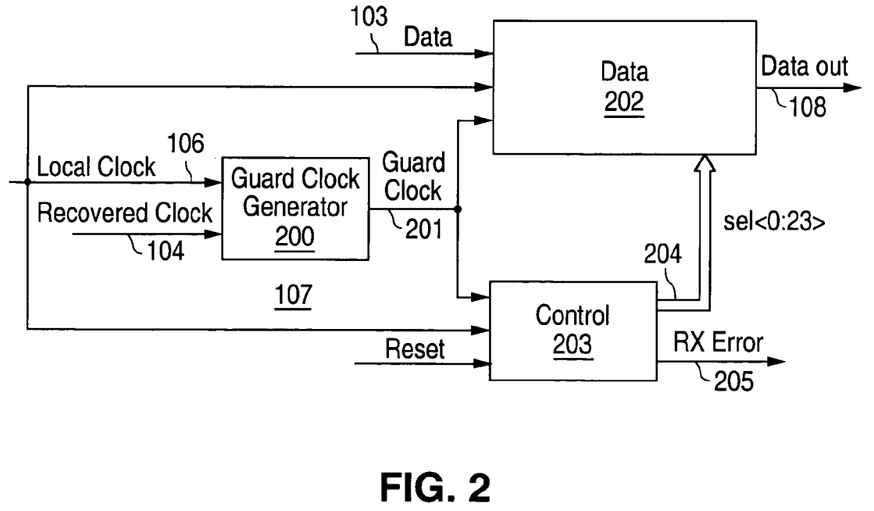
FIG. 2 depicts in greater detail an elastic buffer within a high-speed synchronous data communication system according to one embodiment of the present invention.

FIG. 2 depicts in greater detail an elastic buffer within a high-speed synchronous data communication system according to one embodiment of the present invention. Elastic buffer 107 employs the recovered clock signal 104 from the clock recovery circuit, together with the input data stream 103 (or alternatively the original incoming data stream 101) and the local clock signal 106, producing the output data signal 108 synchronized to the local clock signal 106.

Elastic buffer 107 includes a guard clock generator 200 producing an internally generated guard clock signal 201 based upon the recovered clock signal 104, but constrained so that the guard clock signal 201 has no positive edge within a certain zone near the positive edge of the local clock signal 106. This characteristic of the guard clock signal 201 is employed to avoid setup and hold time violations for flip flops when two clocks bearing no fixed phase relationship are use within a single system.

Elastic buffer 107 also includes: a data unit 202 buffering the incoming data stream, from which the correct data bit is placed on the data out signal 108; and a control unit 203 selecting, via selection control signals 204, the correct data from the data buffered in the data unit 202 to be placed on the data out signal 108, depending on the skew between the local clock signal 106 and the recovered clock signal 104. Control unit 203 also generates an underflow/overflow condition signal (RXError) 205 under the corresponding underflow or overflow circumstances described above. In such a case a reset signal (Reset) is required to return the elastic buffer 107 to operation.

Figure 3:
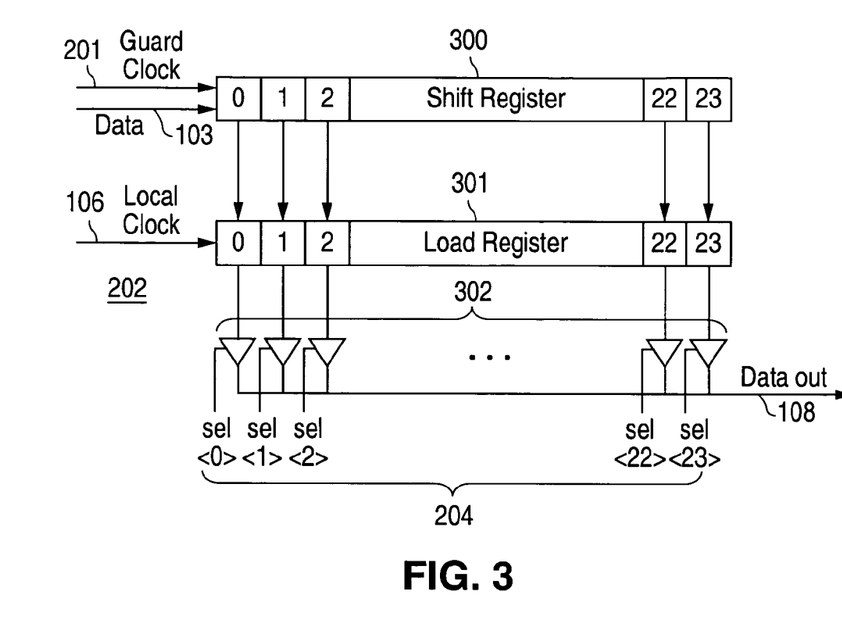
FIG. 3 illustrates one implementation for a data unit portion of an elastic buffer within a high-speed synchronous data communication system according to one embodiment of the present invention.

FIG. 3 illustrates one implementation for a data unit portion of an elastic buffer within a high-speed synchronous data communication system according to one embodiment of the present invention. In the exemplary embodiment, data unit 202 contains a 24 bit wide shift register 300, load register 301, and tristate buffers 302. The input data signal 103 (or incoming data stream 101) is sampled on the positive edge of the guard clock signal 201 and serially shifted into shift register 300. Shift register 300 is first primed with 12 bits of data from the input data signal 103 before any output is transmitted, so the output data signal 108 is not valid for the first 12 cycles of the local clock signal 106.

The contents of shift register 300 are then transferred in parallel to corresponding locations within load register 301 on each positive edge of the local clock signal 106. Use of the guard clock signal 201 for clocking the shift register 300 ensures that there are no setup and hold time violations for the flip flops within load register 301 when data is transferred from shift register 300 to load register 301 clocked by local clock signal 106.

Control unit 203 within elastic buffer 107 generates the index/enable signals (sel<0> through sel<23>) 204 for the tristate buffers 302. One data bit in the 24 bit load register 301 is placed on the data out signal 108, depending on the skew between the local clock signal 106 and the recovered clock signal 104.

Initial latency between the input data signal 103 and the output data signal 108 is twelve local clock cycles, and may then increase or decrease depending on whether the local clock signal 106 is faster or slower than the recovered clock signal 104. If the local clock signal 106 is slower than the recovered clock signal 104, less data is pushed out of load register 301 than is pushed in, and the buffer 107 expands in size while latency between the input data signal 103 and the output data signal 108 increases. If the local clock signal 106 is faster than the recovered clock signal 104, more data is pushed out of load register 301 than is pushed in, and the buffer 107 contracts in size while latency between the input data signal 103 and the output data signal 108 decreases.

Figure 4:
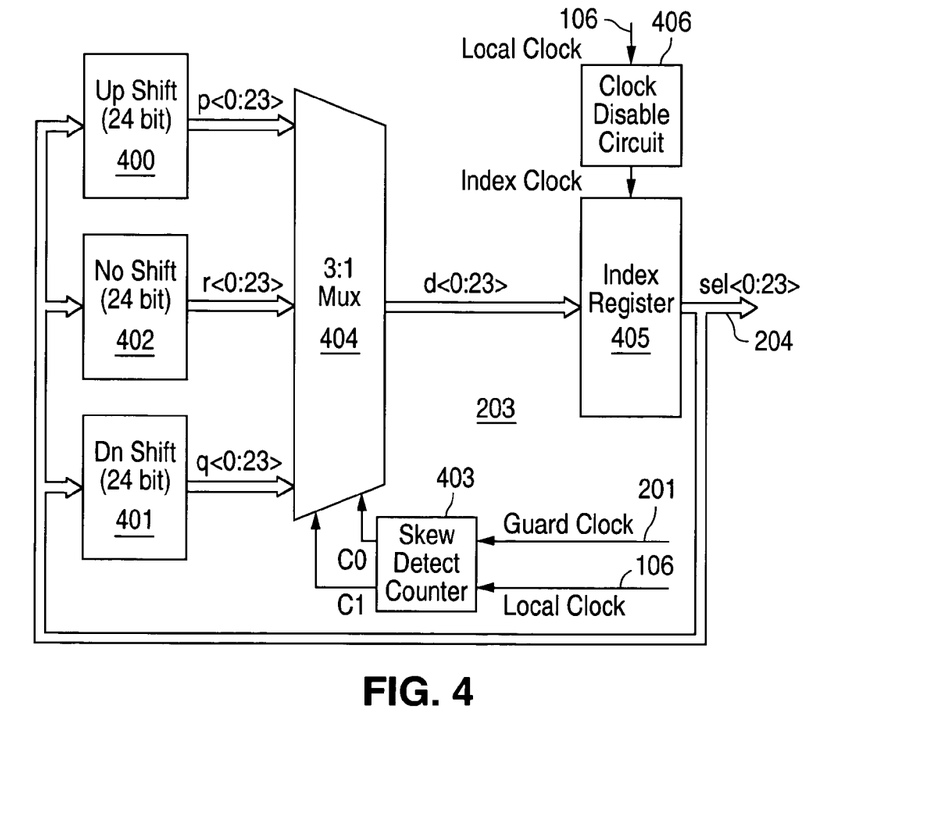
FIG. 4 illustrates one implementation for a control unit portion of an elastic buffer within a high-speed synchronous data communication system according to one embodiment of the present invention.

FIG. 4 illustrates one implementation for a control unit portion of an elastic buffer within a high-speed synchronous data communication system according to one embodiment of the present invention. The control unit 203 generates the index/enable signal (sel<0:23>) 204 for the tristate buffers 302 within the data unit 202. Only one index/enable output (sel<n>) from the control unit 203 is asserted at any particular time, which enables the corresponding tristate buffer within the data unit 202. The particular tristate buffer enabled depends on the phase shift between the local clock signal 106 and the recovered clock signal 104 (as represented by the guard clock 201).

In the 24 bit exemplary embodiment, the up shift unit 400 and the down shift unit 401 receive a 24 bit input signal (sel<0:23>) having only one bit position asserted and shift the received input by one bit up or down, respectively, to produce shifted signals p<0:23> and q<0:23>. The no shift unit 402 passes the received input sel<0:23> through unaltered, producing signal r<0:23>. Based on control inputs C0 and C1 from a skew detect circuit 403, a multiplexer 404 selects one of the three input buses p<0:23>, q<0:23> and r<0:23> from the three shift units 400-402 as an output d<0:23> passed to index register 405. The control (or select) inputs C0 and C1 to multiplexer 404 are generated by skew detect counter 403, which determines the skew between the local clock signal 106 and the recovered clock signal 104 (as represented by the guard clock 201) during every cycle, as described in greater detail below.

The index register 405 consists of 24 D flip flops in the example shown, clocked at the positive edge of the local clock signal 106, which is connected through a clock disable circuit 406. The output index/enable signal sel<0:23> 204 of the index register 405 is fed back as input to the shift units 400-402. When the index/enable signal sel<0:23> 204 changes from sel<n> to either sel<n−1> or sel<n+1>, the clock disable circuit 406 shuts off the (index) clock to the index register 405 for a predetermined number of clock cycles (e.g., thirty), for the reason explained in greater detail below.

At reset, the twelfth flip flop within the index register 405 is set and the remainder are all reset, for an initial pattern within the index register 405—and thus on index/enable signal (sel<0:23>) 204—of 0000 0000 0001 0000 0000 0000 (without the intervening spaces), selecting the twelfth tristate buffer within the data unit 202. When the skew between the recovered and local clock signals 104 and 106 equals an additional clock period, the sole asserted bit within the above initial pattern is shifted to the left or to the right by one bit position, expanding or contracting the elastic buffer 107.

The skew detect counter 403 determines the skew between the recovered clock signal 104 (as represented by the guard clock signal 201) and the local clock signal 106. As a result of use of the guard clock generator 200, the number of positive edges of the guard clock signal 201 occurring between two consecutive positive edges of the local clock signal 106 can be two, one or none.

When the recovered clock signal 104 is faster than the local clock signal 106, after a time interval when the accumulated positive skew over many clock cycles reaches a clock period, there will be two positive edges of the guard clock signal 201 between two consecutive positive edges of the local clock signal 106.

If the recovered clock signal 104 is slower than the local clock signal 106 and the accumulated negative skew between the clocks equals approximately one clock period, there is no positive edge of the guard clock signal 201 between two consecutive positive edges of the local clock signal 106.

When accumulated (positive or negative) skew, if any, between the recovered and local clock signals 104 and 106 is less than a clock period, one positive edge of the guard clock signal 201 will occur between two consecutive positive edges of the local clock signal 106.

The skew detect counter 403 is reset on each positive edge of the local clock signal 106. The counter 403 then counts the number of positive edges of the guard clock signal 201 before being reset (i.e., before the next positive edge of the local clock signal 106, or between two consecutive positive edges of the local clock signal 106). If there is one positive edge of the guard clock signal 201 before the counter 403 is reset by the next positive edge of the local clock signal 106, skew between the recovered and local clocks 104 and 106 is less than a clock period and the output r<0:23> of the no shift unit 402 is selected by the multiplexer 404.

If there are two positive edges of the guard clock signal 201 prior to counter 403 being reset, the accumulated skew between the recovered and local clocks 104 and 106 is equal to an additional clock period and the recovered clock signal 104 is faster. Hence two data bits are shifted into the shift register 300 (clocked by guard clock signal 201) during one period of the local clock signal 106, while only one data bit is moved out of the load register 301 at the positive edge of the local clock signal 106. The output p<0:23> of the up shift unit 400 is selected by the multiplexer 404 and the asserted bit within the index/enable signal sel<0:23> 204 is moved up one bit to account for the extra bit within the shift register 300.

If there is no positive edge of the guard clock signal 201 before the skew detect counter 403 is reset (between two consecutive positive edges of the local clock signal 106), the accumulated skew between the recovered and local clocks 104 and 106 is equal to an additional clock period and the local clock signal 106 is faster. In such a case no data bit is shifted into the shift register 300 during one period of the local clock signal 106, while one data bit is moved out of the load register 301 at the positive edge of the local clock signal 106. The output q<0:23> of the down shift unit 401 is selected by the multiplexer 404 and the asserted bit within the index/enable signal sel<0:23> 204 is moved down one bit.

The up, down and no shift operations within shift buffers 400-402 in control unit 203 may be physically implemented by connecting input bits to the output bits at appropriate position using wires only, without any additional circuitry. For example, in the up shift unit 400, signal line sel<n> may be connected to p<n+1>. Such a shift unit implementation results in no delay in the loop.

FIGS. 5 through 9 are simulation results for an elastic buffer within a high-speed synchronous data communication system according to one embodiment of the present invention. All of the figures relate to a nominal local clock frequency of 480 MHz and a data packet length of 10 Kilobits (Kb), where the local and recovered clocks are synchronized at the beginning of a data packet, such that the elastic buffer must accommodate drift between the local and recovered clock signals across the length of the data packet plus some system timing margins.

Figure 5:
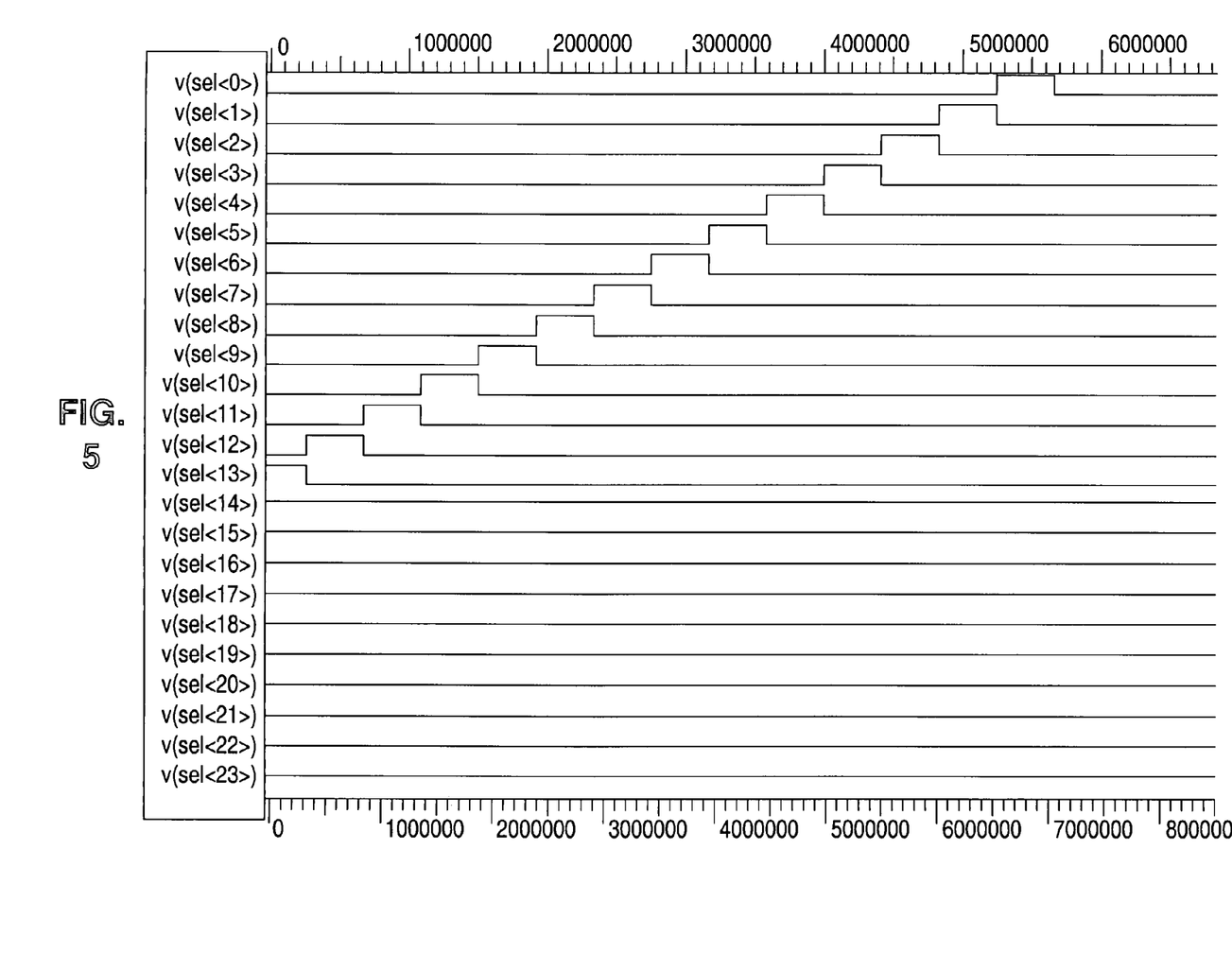
FIGS. 5-9 are simulation results for an elastic buffer within a high-speed synchronous data communication system according to one embodiment of the present invention.

FIG. 5 illustrates the index/enable signal sel<0:23> 204 where the recovered clock signal 104 is slower than the local clock signal 106 by 1000 ppm. The asserted bit within the index/enable signal sel<0:23> 204 moves step-wise from bit position sel<12> through intervening bit positions to bit position sel<0> as the skew between the recovered and local clock signals 104 and 106 accumulates over many clock periods.

Figure 6:
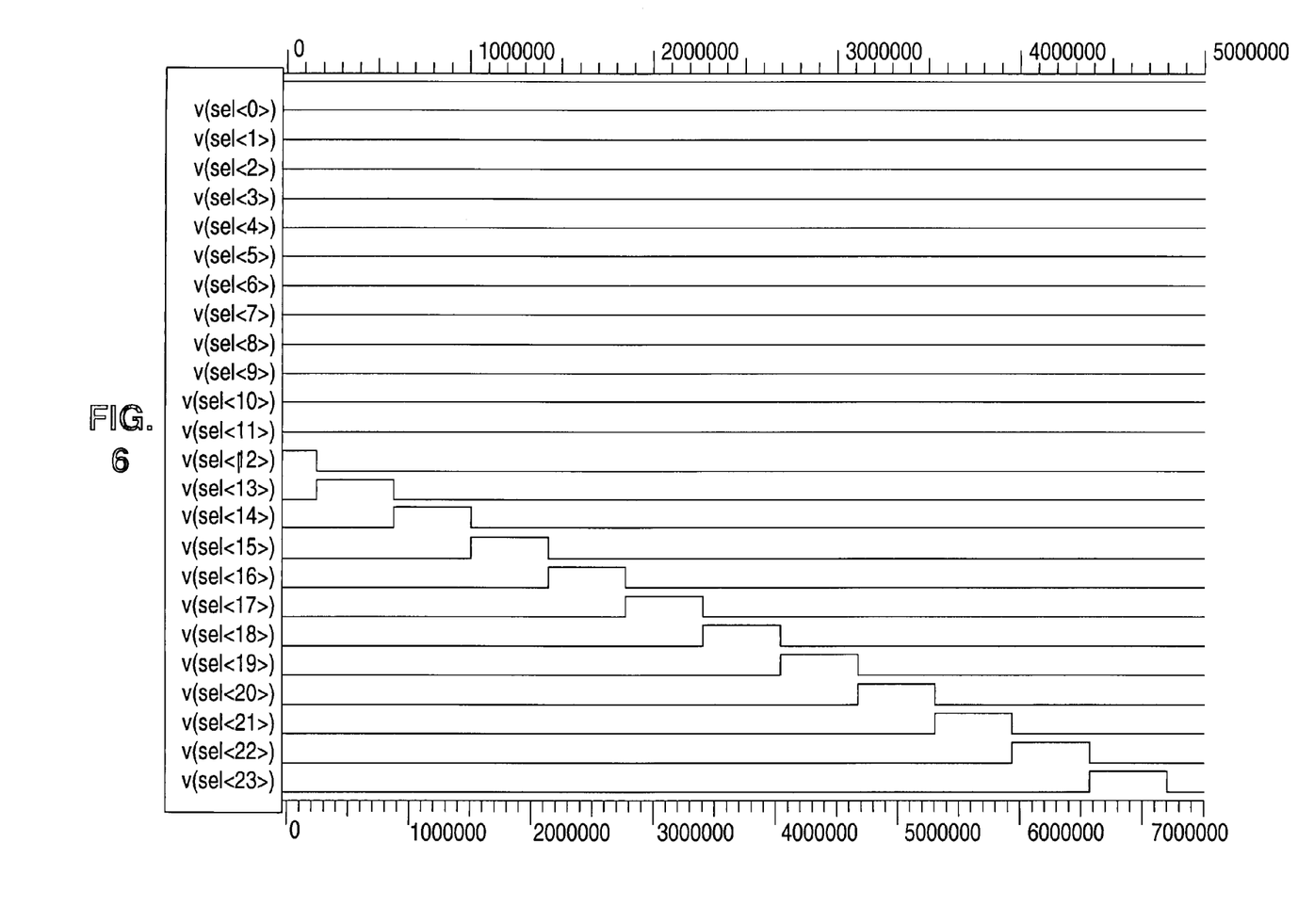

FIG. 6 illustrates the index/enable signal sel<0:23> 204 where the recovered clock signal 104 is 1000 ppm faster than the local clock signal 106. The asserted bit within the index/enable signal sel<0:23> 204 moves from bit position sel<12> to bit position sel<23> as the skew between the recovered and local clock signals 104 and 106 accumulates over many clock periods.

When the positive edges of the recovered clock signal 104 and the local clock signal 106 are sufficiently close, jitter within the clock signal can cause the skew detect counter 403 to mistakenly interpret clock signal fluctuations as skew between the clock signals greater than a clock period, which may cause the skew detect counter to incorrectly switch the index. Thus, clock jitter at the time of an index change may cause the index/enable signal 204 to switch back and forth between sel<n> and either sel<n+1> or sel<n−1>, which will lead to incorrect reading of the incoming data stream.

To avoid errors resulting from clock jitter, the clock disable circuit 406 shuts off the (index) clock signal to the index register 405 for the 30 clock cycles immediately following an index change. The index register 405 therefore maintains the previous contents without being updated for 30 clock cycles. When the skew between the recovered and local clock signals 104 and 106 is sufficient so that the positive edges are far enough apart to avoid clock jitter (e.g., after 30 clock cycles in this example, although those skilled in the art will understand that a different period may be employed), jitter will not affect the skew detect counter 403. The clock to the index register 405 is then once again resumed. Thus, index toggling due to clock jitter is avoided in the present invention.

Figure 7:
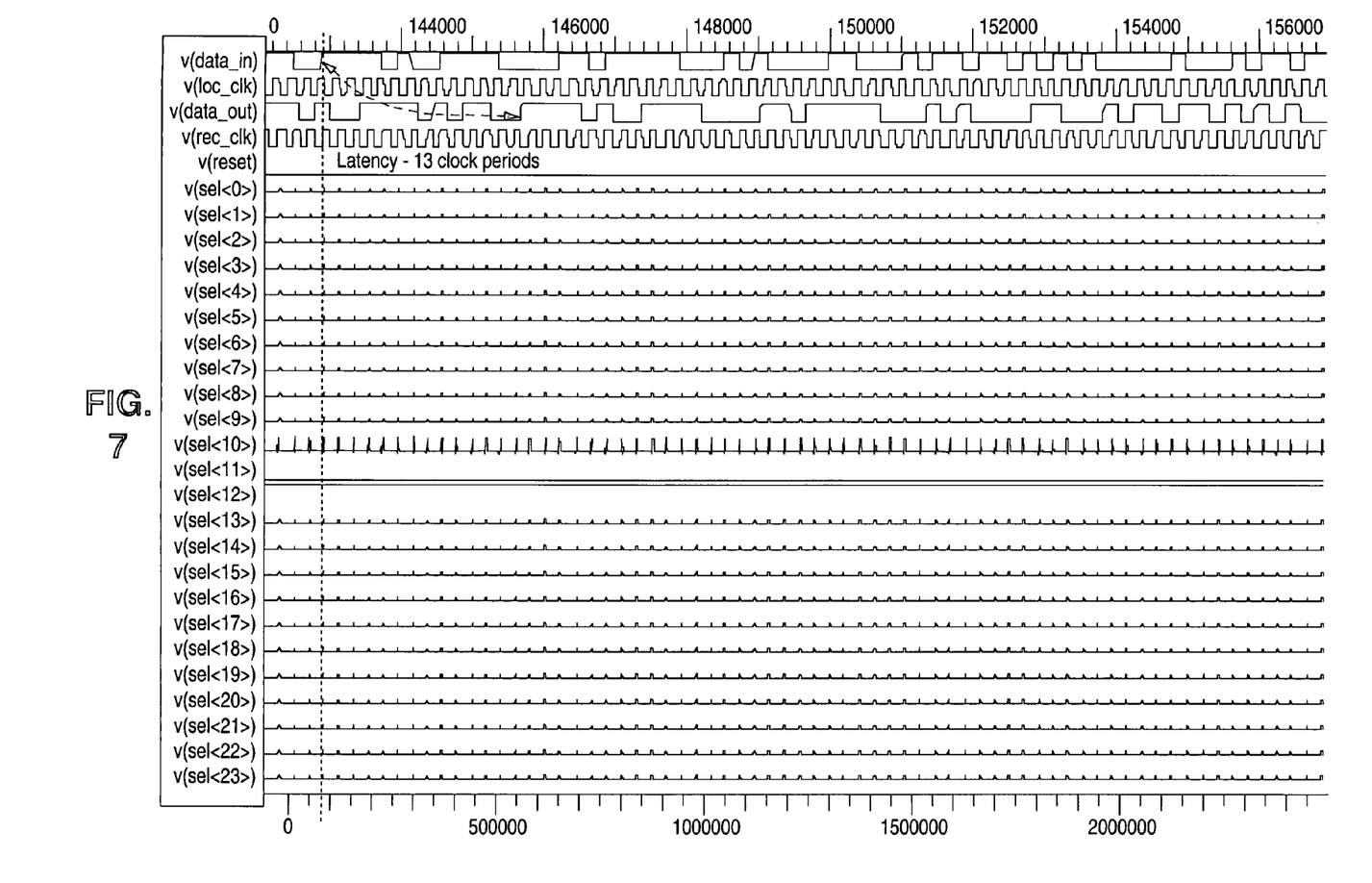
Figure 8:
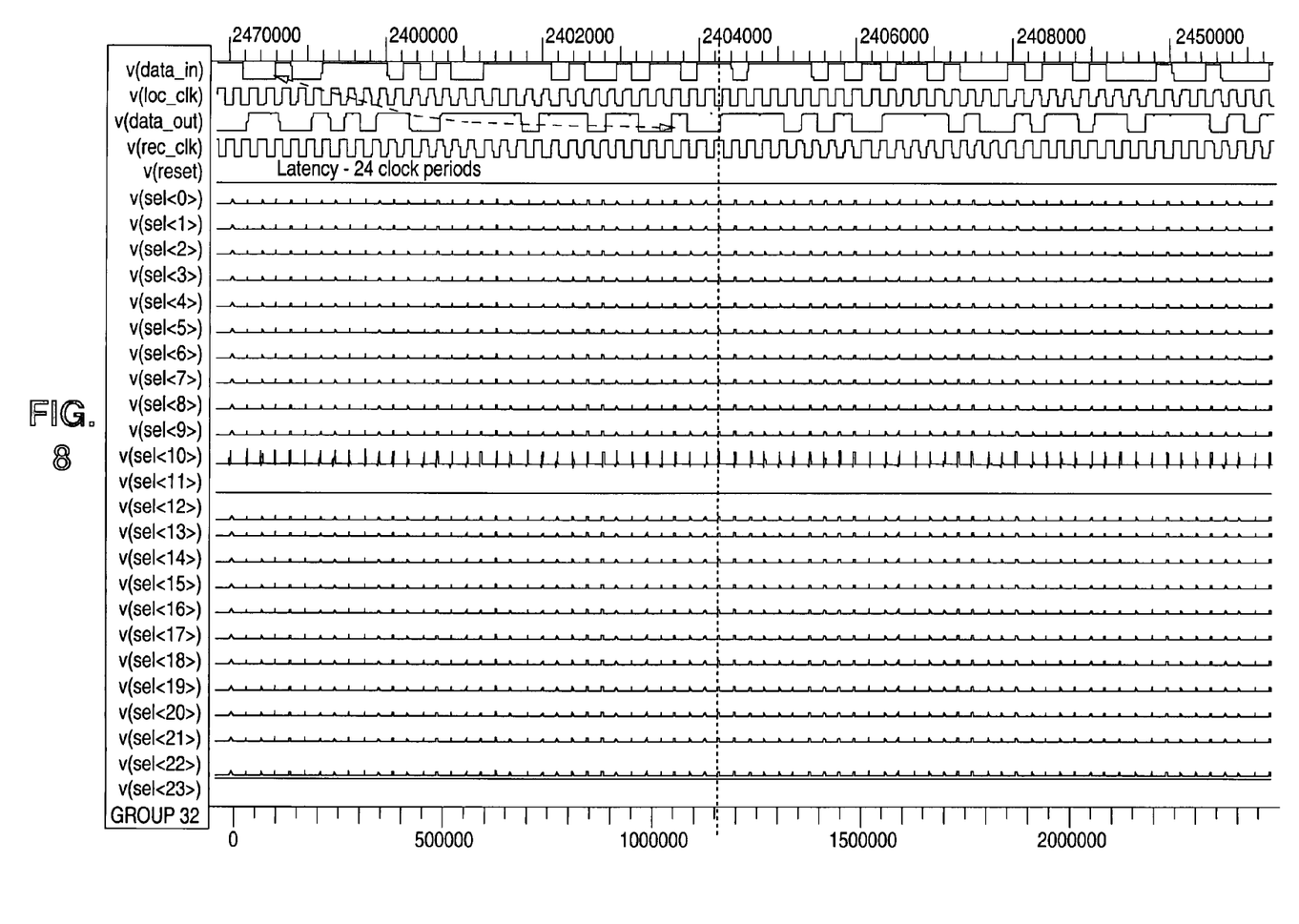
Figure 9:
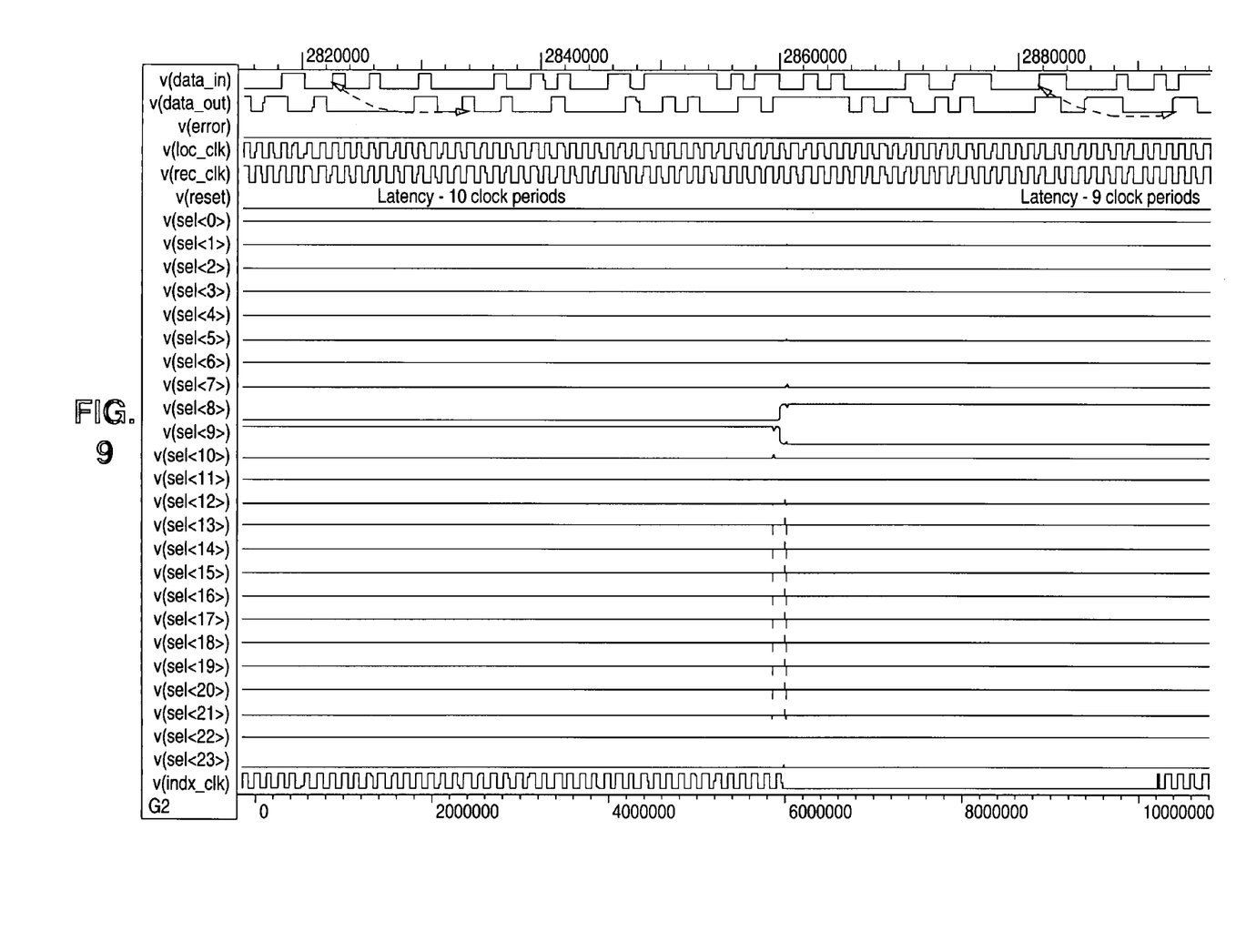

FIGS. 7 through 9 are simulation results for an elastic buffer where the recovered clock signal 104 is 1000 ppm faster (i.e., about 480.48 MHz) than the local clock signal 106 with a random data bit stream "data_in" used as the input data. The simulations are performed at 27° C. with a 3.3 volt (V) power supply.

FIGS. 7 and 8 show the latency between data_in and data_out at different points in time. Since the local clock signal 106 is 1000 ppm slower, the buffer is expanding and therefore latency between data_in and data_out increases as the accumulated skew becomes larger. FIG. 7 shows a latency of 13 bits between data_in and data_out, and the sel<12> signal is high at this point of time, which enables the twelfth tristate buffer within the data unit 202 (i.e., sampling the load register 301 during the thirteenth clock period after the start of the clock period at which the data bit was shifted into the shift register 300). In FIG. 8, the latency between data_in and data_out increases after a period of time to 24 clock periods, as the skew between clocks accumulates to 24 clock cycles. The sel<23> signal is asserted at this time.

FIG. 9 illustrates the signals for the elastic buffer at the time of index change where the local clock signal 106 is 1000 ppm faster than the recovered clock signal 104. The Index Clock (from clock disable circuitry 406 in control unit 203 is shut off for 30 clock cycles just after the index change from sel<9> to sel<8> to avoid toggling of the index between values sel<n> and sel<n−1> as a result of clock jitter. The latency between data_in and data_out drops from ten clock periods to nine clock periods.

The present invention provides an elastic buffer design well suited for high-speed indirect synchronous data transfer applications, taking into consideration the effect of clock jitter and minimizing bit error in the presence of such jitter. The elastic buffer circuit may be used in high-speed applications such as 480 MHz USB 2.0 receivers. The buffer compensates for frequency drift between the local and recovered clocks over packet size, allowing larger packet lengths to be transmitted without extra bits being added or lost from the incoming data stream. The exemplary embodiment includes a 24 bit deep, one bit wide FIFO buffer and can compensate for a 1000 ppm drift between the local and recovered clocks over a maximum packet length of 1 kilobyte (KB), plus system timing margins. The design takes into account the possibility of errors in reading the incoming data stream correctly due to clock jitter.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. An elastic buffer comprising:
  a first input for receiving an input data signal containing data sequences and embedded timing information;
  a second input for receiving a recovered clock signal generated from the embedded timing information;
  a third input for receiving a local clock signal synchronized in frequency to the recovered clock signal prior to a start of each data sequence;
  a data unit for receiving data clocked based upon the recovered clock signal and transmitting data clocked by the local clock signal, wherein the data unit accommodates skew of greater than one clock period between the recovered and local clock signals across each data sequence following the corresponding synchronization of the local clock signal to the recovered clock signal, wherein the data unit includes a buffer expanding or contracting in size whenever the skew between the recovered and local clock signals exceeds one clock period; and a control unit for disabling expansion or contraction of the buffer during periods when clock jitter is likely.

2. The elastic buffer according to claim 1, wherein the buffer comprises a first in, first out (FIFO) buffer.

3. The elastic buffer according to claim 2, wherein:
the control unit generates an index for reading data out of the FIFO buffer, wherein the FIFO buffer expands or contracts when the index is adjusted.

4. The elastic buffer according to claim 3, wherein expansion or contraction of the FIFO buffer is disabled during periods immediately following adjustment of the index.

5. The elastic buffer according to claim 2, further comprising:
a guard clock generator for generating a guard clock signal tracking the recovered clock signal but with positive edges for the guard clock signal constrained from occurring within a predefined interval around positive edges of the local clock signal,
wherein data is clocked into the FIFO buffer with the guard clock signal.

6. The elastic buffer according to claim 5, wherein skew of greater than one clock period between the recovered and local clock signals is detected by counting a number of positive edges of the guard clock signal occurring between successive positive edges of the local clock signal.

7. A method of operating an elastic buffer comprising:
receiving an input data signal containing data sequences and embedded timing information;
receiving a recovered clock signal generated from the embedded timing information;
receiving data clocked based upon the recovered clock signal and transmitting data clocked by a local clock signal;
accommodating skew of greater than one clock period between the recovered and local clock signals across each data sequence following a corresponding synchronization of the local clock signal to the recovered clock signal, wherein accommodating the skew comprises employing a buffer expanding or contracting in size whenever the skew between the recovered and local clock signals exceeds one clock period; and
disabling expansion or contraction of the buffer during periods when clock jitter is likely.

8. The method according to claim 7, wherein:
employing the buffer comprises employing a first in, first out (FIFO) buffer.

9. The method according to claim 8, further comprising:
generating an index for reading data out of the FIFO buffer, wherein the FIFO buffer expands or contracts when the index is adjusted.

10. The method according to claim 8, wherein the step of disabling expansion or contraction of the buffer during periods when clock jitter is likely further comprises:
disabling expansion or contraction of the FIFO buffer during periods immediately following adjustment of the index.

11. The method according to claim 8, further comprising:
generating a guard clock signal tracking the recovered clock signal but with positive edges for the guard clock signal constrained from occurring within a predefined interval around positive edges of the local clock signal,
wherein data is clocked into the FIFO buffer with the guard clock signal.

12. The method according to claim 11, further comprising:
detecting skew of greater than one clock period between the recovered and local clock signals by counting a number of positive edges of the guard clock signal occurring between successive positive edges of the local clock signal.

13. A data receiver comprising:
a clock recovery unit for receiving an input data signal containing data sequences and embedded timing information and generating a recovered clock signal from the embedded timing information;
a local clock generator for generating a local clock signal; and
an elastic buffer for receiving the recovered clock signal, the local clock signal and the data sequences, clocking data bits for each data sequence into storage within the elastic buffer based upon the recovered clock signal, and clocking the data bits out of storage within the elastic buffer with the local clock signal, wherein the elastic buffer accommodates skew of greater than one clock period between the recovered and local clock signals across each data sequence following a corresponding synchronization of the local clock signal to the recovered clock signal, wherein the elastic buffer expands or contracts in size whenever the skew between the recovered and local clock signals exceeds one clock period, and wherein a control unit disables expansion or contraction of the elastic buffer during periods when clock jitter is likely.

14. The data receiver according to claim 13, wherein the elastic buffer further comprises:
a data unit including the storage for the data bits; and
a guard clock generator for generating a guard clock signal tracking the recovered clock signal but with positive edges for the guard clock signal constrained from occurring within a predefined interval around positive edges of the local clock signal,
wherein the data bits are clocked into the data unit with the guard clock signal; and
wherein the control unit generates an index for reading data bits out of the data unit.

15. The data receiver according to claim 14, wherein the control unit further comprises:
a skew detector for detecting skew between the local and guard clock signals equal to at least one clock period by counting a number of positive edges of the guard clock signal occurring between successive positive edges of the local clock signal.

16. A data receiver comprising:
a clock recovery unit for receiving an input data signal containing data sequences and embedded timing information and generating a recovered clock signal from the embedded timing information;
a local clock generator for generating a local clock signal; and
an elastic buffer for receiving the recovered clock signal, the local clock signal and the data sequences, clocking data bits for each data sequence into storage within the elastic buffer based upon the recovered clock signal, and clocking the data bits out of storage within the elastic buffer with the local clock signal, wherein the elastic buffer accommodates skew of greater than one clock period between the recovered and local clock signals across each data sequence following a corresponding synchronization of the local clock signal to the recovered clock signal;
wherein the elastic buffer comprises:
a data unit including the storage for the data bits;
a control unit for generating an index for reading data bits out of the data unit; and a guard clock generator for generating a guard clock signal tracking the recovered clock signal but with positive edges for the guard clock signal constrained from occurring within a predefined interval around positive edges of the local clock signal, wherein the data bits are clocked into the data unit with the guard clock signal; and wherein the data unit further comprises:

a shift register within the data unit, wherein the data bits are shifted into the shift register with the guard clock signal;

a load register for loading contents of the shift register into corresponding bit positions within the load register clocked with the local clock signal; and a plurality of tristate buffers for selectively coupling one bit position within the load register to a data output, wherein the index controls which of the plurality of tristate buffers currently couples a corresponding bit position within the load register to the data output, and wherein the control unit adjusts the index each time the skew between the recovered and local clock signals equals a clock period.

17. The data receiver according to claim 16, wherein the control unit disables adjustment to the index during periods when clock jitter is likely.

18. The data receiver according to claim 17, wherein adjustment to the index is disabled during periods immediately following an adjustment of the index.

* * * * *